United States Patent
Brandt et al.

[11] Patent Number: 6,088,644
[45] Date of Patent: Jul. 11, 2000

[54] METHOD AND APPARATUS FOR DETERMINING A PATH TO BE TRAVERSED BY A MOBILE MACHINE

[75] Inventors: Everett G. Brandt, Brimfield; Robert J. McGee; Brian D. Rockwood, both of Peoria, all of Ill.

[73] Assignee: Caterpillar Inc., Peoria, Ill.

[21] Appl. No.: 09/133,000

[22] Filed: Aug. 12, 1998

[51] Int. Cl.$^7$ ............................................. G06F 19/00
[52] U.S. Cl. ................................ 701/50; 172/4.5
[58] Field of Search .......................... 701/50, 207, 209; 342/357.01, 357.17; 340/988, 990, 995; 172/4.5, 9; 37/348

[56] References Cited

U.S. PATENT DOCUMENTS

| | | | |
|---|---|---|---|
| 5,005,652 | 4/1991 | Johnson | 701/50 |
| 5,204,814 | 4/1993 | Noonan et al. | 364/424.02 |
| 5,375,663 | 12/1994 | Teach | 172/4.5 |
| 5,471,391 | 11/1995 | Gudat et al. | 364/424.07 |
| 5,493,494 | 2/1996 | Henderson | 364/424.07 |
| 5,528,888 | 6/1996 | Miyamoto et al. | 701/50 |
| 5,631,658 | 5/1997 | Gudat et al. | 342/457 |
| 5,646,844 | 7/1997 | Gudat et al. | 364/449.2 |
| 5,696,675 | 12/1997 | Nakamura et al. | 701/50 |
| 5,735,352 | 4/1998 | Henderson et al. | 172/4.5 |
| 5,955,973 | 9/1999 | Anderson | 701/50 |

*Primary Examiner*—Gary Chin
*Attorney, Agent, or Firm*—Haverstock, Garrett & Roberts; Jeffrey L. Myers

[57] ABSTRACT

In one embodiment of the present invention, an apparatus and method for determining a path or series of paths at a work site for a mobile machine capable of operating autonomously or semi-autonomously is provided. The present invention determines a series of rows that are substantially parallel to the machine's heading. The width of the rows is based on the width of the path worked by one or more of the machine's work implements. The work site is bounded by three or more corner points and the perimeter of the work site is defined by boundary lines connecting the corner points. A first line substantially perpendicular to the machine's heading is calculated starting at an initial corner point and ending at a terminal point along the line having a distance approximately equal to the width of the path. A second line parallel to the machine's heading and passing through the terminal point is determined. The points of intersection of the second line with the boundary lines are calculated and stored as end points of a first path. Endpoints of successive paths are found in a similar manner by incrementing the distance along the parallel line by the width of the work path.

12 Claims, 9 Drawing Sheets

METHOD AND APPARATUS FOR DETERMINING A PATH TO BE TRAVERSED BY A MOBILE MACHINE

TECHNICAL FIELD

The present invention relates generally to the operation of a mobile machine for traversing an area of a work site and, more particularly, to a method and apparatus for determining a set of paths to be traversed by a mobile machine.

As used in this patent specification the phrase "mobile machinery" and various approximations thereof refer to self-propelled machines such as track-type tractors, road graders, pavers, asphalt layers, agricultural machinery, compactors, lawnmowers, and the like, which exhibit both (1) mobility over or through a work site, and (2) the capacity to alter the topography or appearance of a work site with a tool or operative portion of the machine such as a bucket, shovel, blade, ripper, compacting wheel and the like.

BACKGROUND

There is an increasing demand to automate mobile machinery that traditionally requires a human operator. There are several reasons for this. Unlike a human operator, automated machinery remains consistently productive regardless of environmental conditions and prolonged work hours. Automated machinery is also ideal for applications where conditions are unsuitable or undesirable for humans. Further, automated machinery enables more accurate operation and compensates for lack of operator skill.

The work cycles of different types of machines may include similar requirements. Some mobile machines, including earth, asphalt, and trash compactors, repeatedly traverse a site until the material is compressed to the desired degree. Other types of mobile machines, such as lawn mowing machinery, traverse an area only once during a work cycle. During autonomous operation, these machines require means to determine their position, the area to be traversed, an optimal path to follow while traversing the area, and means to control their movement while traversing the path.

In the prior art, a site survey is typically conducted manually using line-of-sight optical instruments or other static, point by point measuring techniques. Thereafter, the site is carefully marked with stakes to provide visual cues to the operator of the machinery. Systems for achieving a desired degree of compaction or desired site topography with mobile terrain-shaping and material compacting machinery are disclosed in U.S. Pat. Nos. 5,631,658; 5,493,494; 5,471,391; and 5,646,844. In these patents, the actual site topography is determined on a continual basis using a global positioning system on the machine to provide information regarding the position of the machine in space. Using the position of the machine, the actual topography of the terrain is updated as the machine traverses the work site and the difference between the actual site topography and the desired site topography is determined on a continual basis. The areas where there are differences between the desired and the actual site topography indicate areas where work still needs to be done with the machine. This information is provided to an operator via a real-time graphical display to provide visual cues for operating the machine over a work site. The prior art methods do not, however, disclose means for determining the path or set of paths to be used by a mobile machine that is capable of traversing the work area autonomously. Further, with autonomous machinery, the series of paths must be provided in a manner that is usable by a computer-based planning and navigation system that determines how to steer the machine to follow the paths and how to transition the machine from one path to the next.

Accordingly, the present invention is directed to overcoming one or more of the problems as set forth above.

DISCLOSURE OF THE INVENTION

In one embodiment of the present invention, an apparatus and method for determining a path or series of paths at a work site for a mobile machine capable of operating autonomously or semi-autonomously includes computing the heading of the machine by taking two or more position readings using a positioning system as the machine moves in a particular direction. The present invention determines a series of rows that are substantially parallel to the machine's heading. The width of the rows is based on the width of the path worked by one or more of the machine's work implements. The work site is bounded by three or more corner points and the perimeter of the work site is defined by boundary lines connecting the corner points. A first line substantially perpendicular to the machine's heading is calculated starting at an initial corner point, and ending at a terminal point along the line having a distance approximately equal to the width of the path. The initial corner point is typically the corner point furthest to the left of the machine. A second line parallel to the machine's heading and passing through the terminal point is determined. The points of intersection of the second line with the boundary lines are calculated and stored as end points of a first path. Endpoints of successive paths are found in a similar manner by incrementing the distance along the perpendicular line by the width of the work path. The cross product of a pair of vectors having orientation and position based on the terminal point is used to determine when the paths extend beyond corner points adjacent to the initial corner point. When this occurs, adjacent boundary lines are used to determine the end points of each path.

BRIEF DESCRIPTION OF DRAWINGS

FIG. 6a is a perspective view of a track-type tractor which may utilize the present invention;

FIG. 6b is a diagrammatic representation of a series of paths for the track-type tractor to traverse as determined by the present invention;

FIG. 8 is a diagrammatic representation of the vector components used to determine another one of the paths for the wheeled compactor;

BEST MODE FOR CARRYING OUT THE INVENTION

Figure 1:
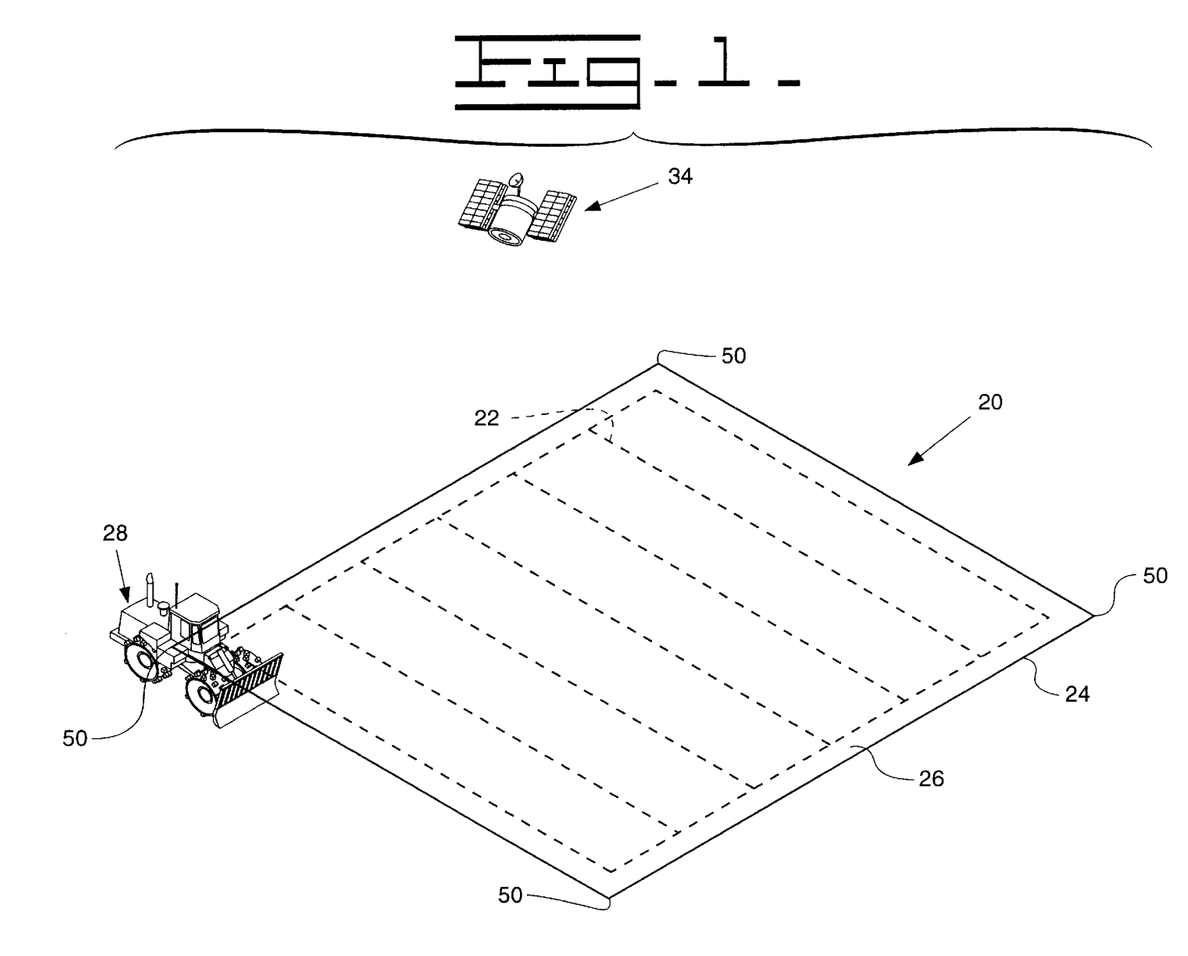
FIG. 1 is a top plan view of a work area having a plurality of work paths.

Referring to FIG. 1, a top plan view of a work area 20 is shown having a plurality of paths 22 bounded by a perimeter 24. A cushion boundary 26 is included between paths 22 and the perimeter 24 so that small inaccuracies in data provided by sensor systems do not interfere with the present invention as described hereinbelow. The paths 22 are exemplary of the manner in which the work area 20 may be divided where a task such as material compacting or lawn mowing is performed by a mobile machine 28. It should be noted that a wide variety of patterns may be used to divide the work area 20 into paths 22. Some factors for selecting a particular pattern include the area covered during one pass of the mobile machine 28, the turning radius of the mobile machine 28, and the size of the work area 20. The present invention is applicable to tasks that involve traversing the work area 20 only once, such as lawn mowing, or several times, such as material compaction.

Figure 2:
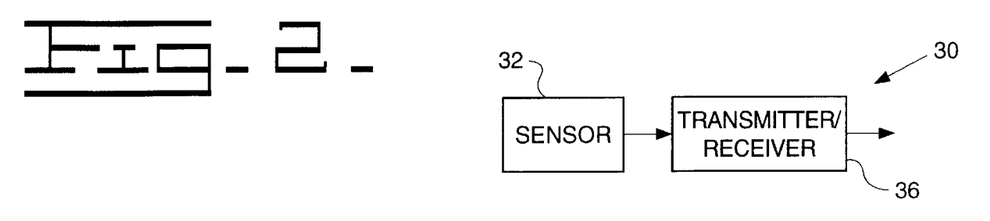
FIG. 2 is a functional block diagram of a sensor system for providing position data.

The present invention includes means to generate signals representing the instantaneous position in at least two-dimensional space of a portion of the mobile machine 28. Such means, as shown in FIG. 2, includes a vehicle positioning system 30 capable of providing information regarding the position of the mobile machine 28 in two-dimensional or three-dimensional space. Several different types of sensors 32 are suitable for use in such positioning systems 30 including, but not limited to, inertial gyros, lasers, global positioning systems (GPS), GPS/laser combinations, and radar. In certain types of positioning systems 30, such as the GPS satellite 34 shown in FIG. 1, position data is transmitted to a receiver 38. The receiver 38 is in communication with a sensor processing module 46 that provides sensor data to control system computer 40 as shown in control system 42 in FIG. 3.

Figure 3:
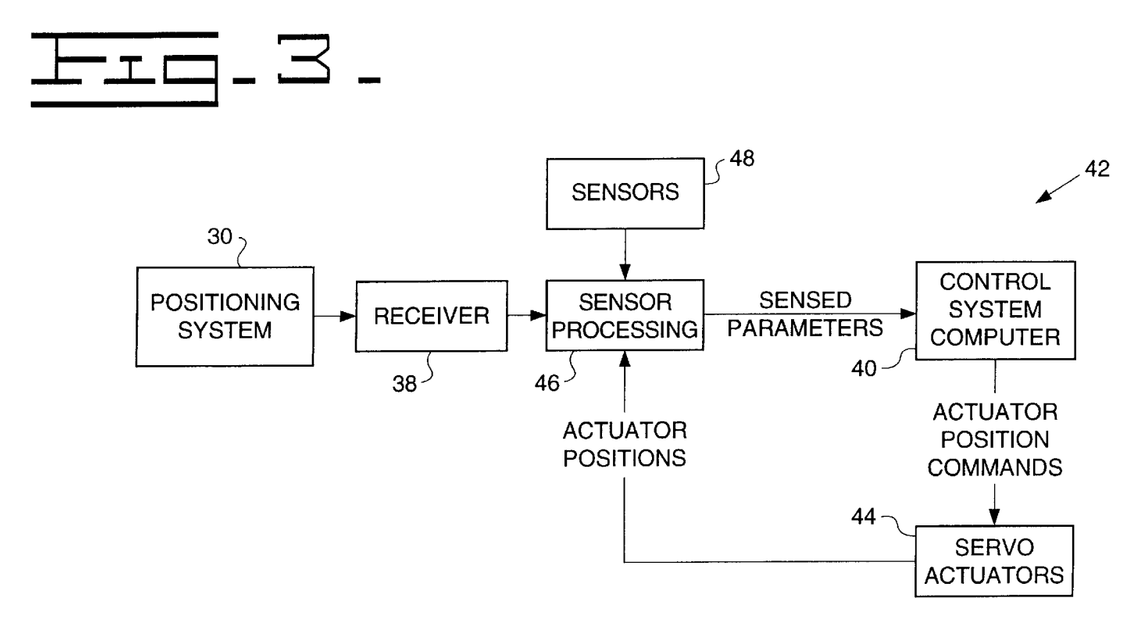
FIG. 3 is a functional block diagram used to carry out the present invention including a control system for a mobile machine.

The control system computer 40 includes a data processor, such as a microprocessor, random access memory, read only memory, and a data bus for receiving data from and transmitting data to various devices. The control system computer 40 executes logic and equations implemented in one or more software programs to determine actuator position command signals for operating various pumps, valves, hydraulic cylinders, motor/steering mechanisms and other servo-actuated controls for controlling movement of the mobile machine 28. Servo-actuators 44 receive position commands but typically are not capable of moving to the commanded position instantaneously. Actual actuator positions are sensed and input to the sensor processing module 46 that conditions the sensor signals for use by the control system software programs. The position data of the mobile machine 28 from the positioning system 30 as well as data from other sensors 48 may also be conditioned by the sensor processing module 46, which filters noise from the signals and performs any other processing required. The sensor processing module 46 may be implemented in software that is executed a computer, such as the control system computer 40, or it may be implemented with electronic circuitry. Sensed parameters from the sensor processing module 46 are input to the control system computer 40 for use by the software programs.

The mobile machines 28 such as the compactors 50, 74, and the tractor 86 are capable of autonomous or semi-autonomous operation using an electro-hydraulic control system 42 as shown in FIG. 3. These controls operate, for example, steering, brake, throttle, blade, and motor controls. The mobile machines 28 are equipped with a positioning system capable of dynamically determining the position of the machine with a high degree of accuracy as it traverses the work area 20. In a preferred embodiment, aspects of the method and apparatus of the present invention are realized through utilization of three-dimensional position information derived from a GPS sensor system using a phase differential GPS receiver. Such GPS receivers utilize signals generated by global positioning satellites as well as a differential signal from a base station having a reference receiver of known position coordinates to generate position coordinate data to within known accuracy.

Figure 4A:
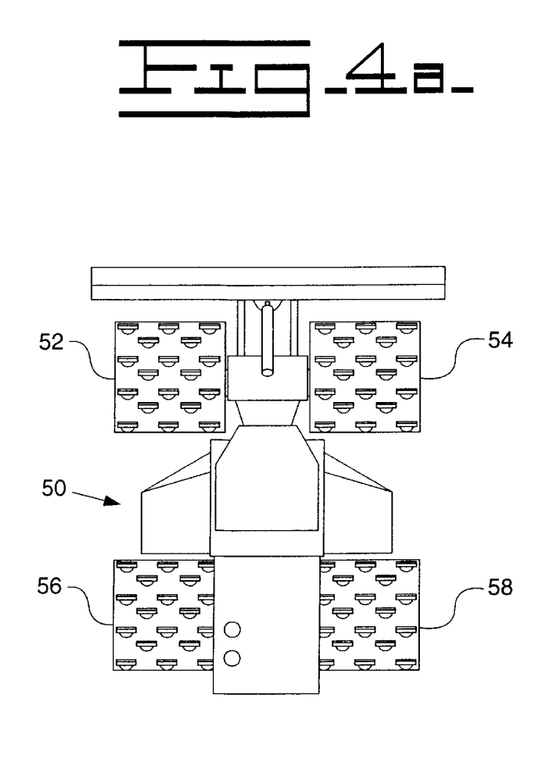
FIG. 4a is a perspective view of a wheeled compactor which may utilize the present invention.

Referring to FIGS. 4a through 6b, examples of different types of mobile machines 28 and the corresponding footprints of their work implements are shown. FIG. 4a is a landfill compacting machine 50 and FIG. 4b represents the footprint of two front wheels 52, 54. The front wheels 52, 54 and rear wheels 56, 58 are the work implements of compactor 50 as the wide, studded surfaces are capable of compacting waste and trash in a landfill in known fashion. Compactor 50 is heavy, and may be weighted to increase the compacting force exerted by the wheels 52, 54, 56, 58 on the material over which they traverse. In FIG. 4b, a space 60 is shown between the front wheels 52, 54 of compactor 50. When the compactor 50 traverses the work area 20, the material in the space 60 between the wheels 52, 54 is not compacted. In order to compact the uncompacted area during a subsequent pass, the wheels on the left or right side of the compactor must overlap the space 60. One pattern for accomplishing this is shown by a set of four paths 62, 64, 66, 68 in FIG. 4b, where the compactor follows path 64 to overlap the space 60 so that wheel 54 compacts the space 60 left by the compactor 50 as it traverses path 62. After traversing path 64, the compactor 50 traverses path 66, once again leaving space 60 between wheels 52 and 54. Path 68 is planned so that wheel 54 overlaps the space 60. The distance between alternating paths 62, 64, 66, 68 thus varies between a short distance 70 and a long distance 72. This pattern is useful when the space is less than or equal to the width of one of the work implements.

Figure 5A:
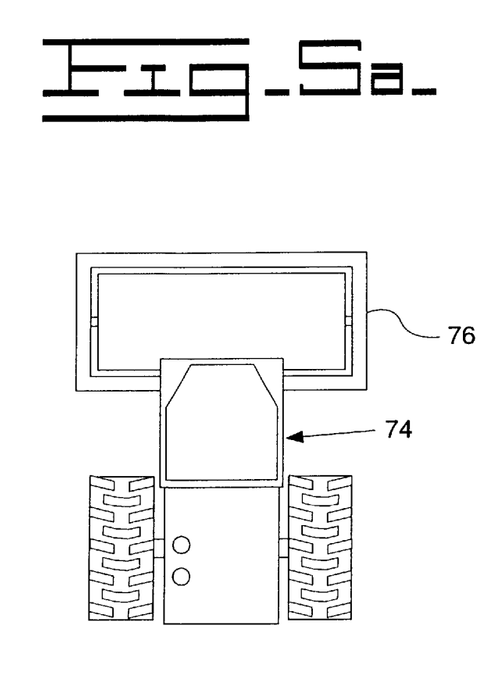
FIG. 5a is a perspective view of a single roll compactor which may utilize the present invention.
Figure 5B:
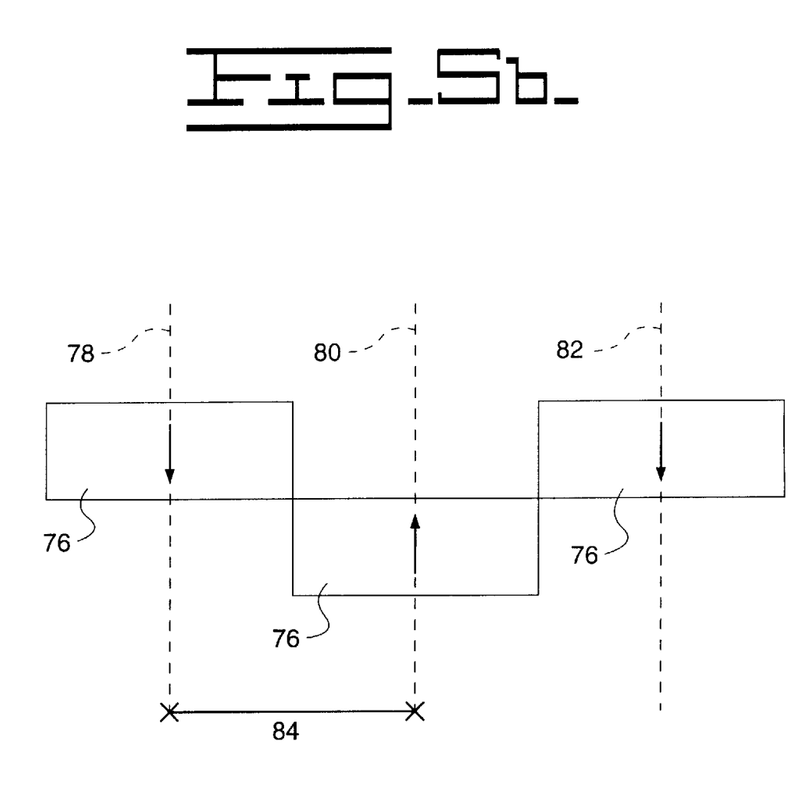
FIG. 5b is a diagrammatic representation of a series of paths for the single roll compactor to traverse as determined by the present invention.

FIG. 5a shows another type of compactor 74 with a work implement consisting of a large, weighted roller 76. FIG. 5b represents the footprint of the roller 76 on three parallel paths 78, 80, 82. The distance 84 between the paths 78, 80, 82 is approximately equivalent to the width of roller 76 and remains the same since no space 60 is left between the work implement. This pattern of paths is applicable to any type of mobile machine 28 having a work implement that typically does not leave an area untouched as it traverses the path, such as a lawn mower.

FIG. 6a shows an example of track-type tractor 86 having a space 88 between tracks 90, 92 that is greater than the width of one track 90 or 92. FIG. 6b shows a series of paths 94, 96, 98, 100 that may be used when the tracks 90, 92 are used as work implements, such as compacting material. In this situation, at least two paths must be planned to cover the space 88 as shown in FIG. 6b by paths 94, 96, and 98. The distance between paths 94 and 96, and paths 96 and 98 is less than or equal to the width of the tracks 90 or 92. The distance between paths 98 and 100 is equal to the width of the tractor 86.

Figure 4B:
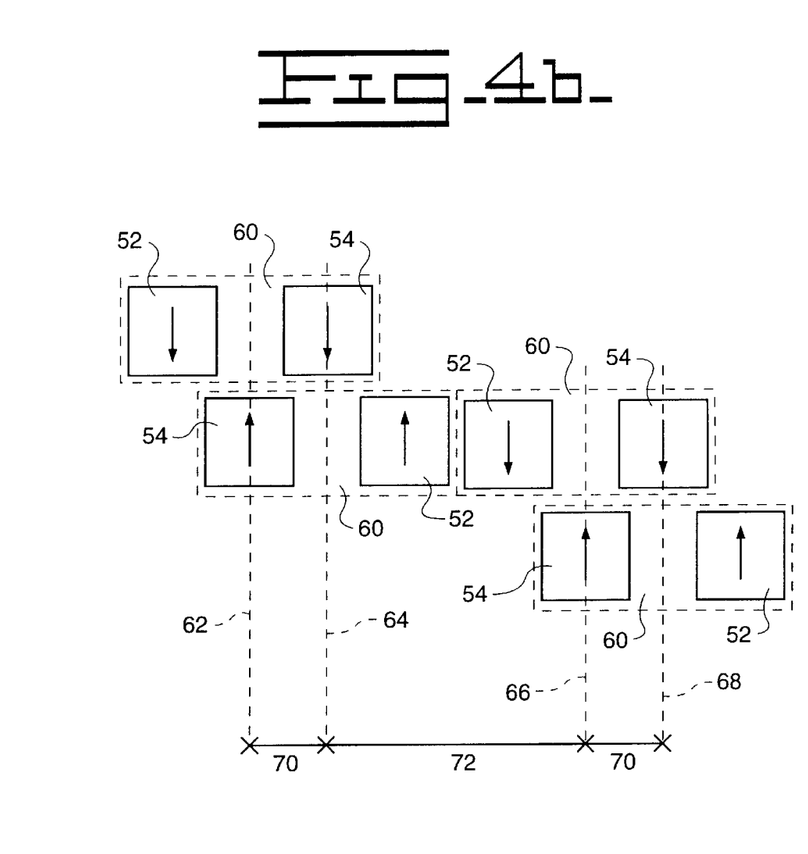
FIG. 4b is a diagrammatic representation of a series of paths for the wheeled compactor to traverse as determined by the present invention.

FIGS. 4b, 5b, and 6b are examples of patterns of paths that may be planned for various types of mobile machines 28. Other mobile machines 28 having different configurations of work implements may be used with the present invention as long as information regarding the number of work implements and the widths of the work implements is provided. Further, the widths of the work implements do not have to be the same, as the present invention will take into account the area covered by each work implement and plan accordingly.

Figure 7:
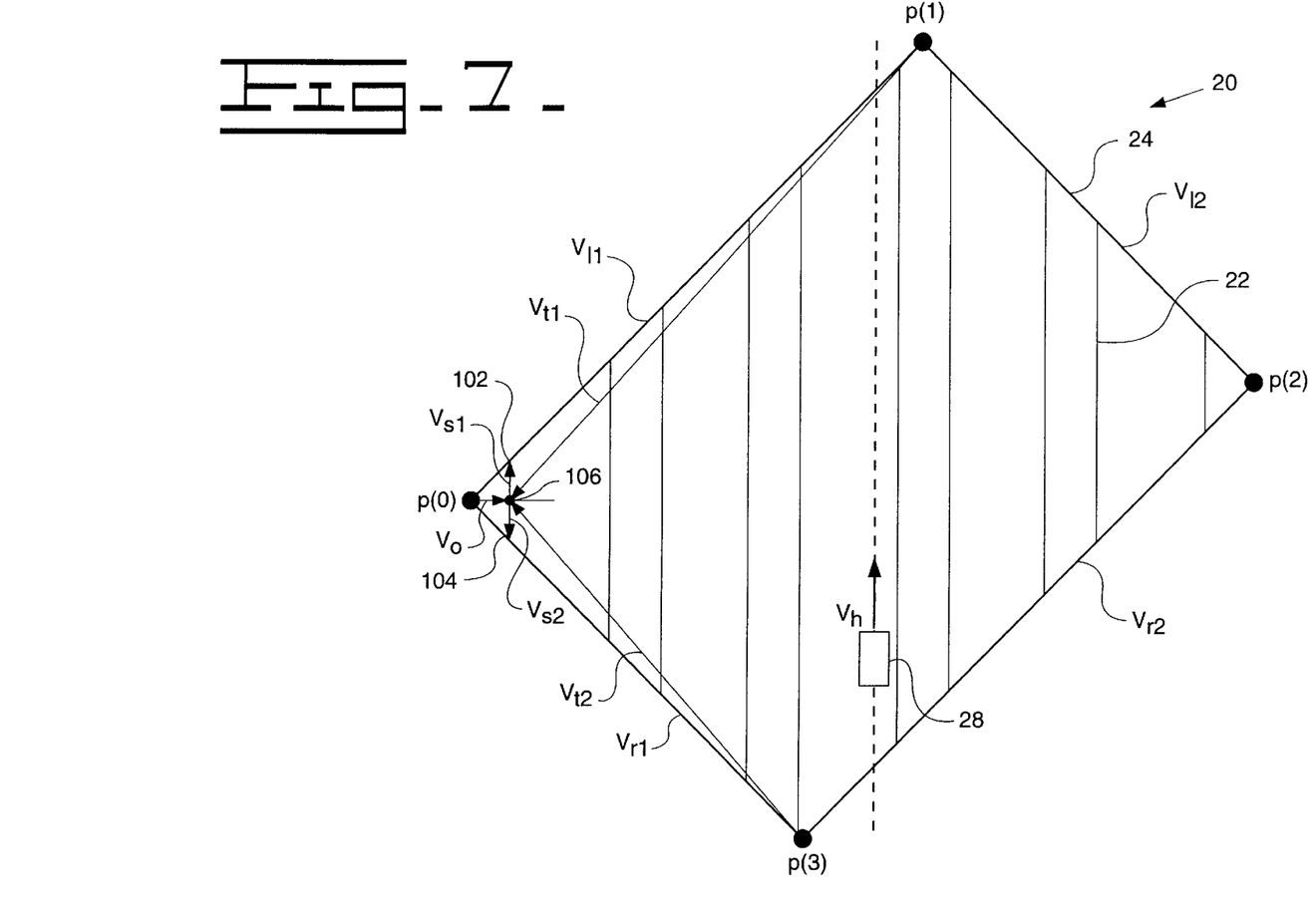
FIG. 7 is a diagrammatic representation of the vector components used to determine one of the paths for the wheeled compactor.

In one embodiment, the present invention for a method for determining the path 22 or series of paths in work area 20 bounded by perimeter 24, as shown in FIG. 7, involves determining the heading of the paths 22 based on the heading of the mobile machine 28, and determining the distance between adjacent paths 22 based on the width of one or more work implements on the mobile machine 28. Endpoints 102, 104 of the path, based on the location of corner points p(0), p(1), p(2), and p(3) of perimeter 24, the width of the mobile machine 28, and the width of one or more work implements, is then determined. Vectors $v_h$, $v_o$, $v_{t1}$, $v_{s1}$, $v_{t2}$, $v_l$, $v_r$, and $v_{s2}$ are used to determine path 22. Vector $v_h$ is the heading vector of the mobile machine 28.

Vector $v_o$ is a vector substantially perpendicular to the heading vector $v_h$, with an origin at corner point p(0). The corner point p(i) that is furthest to the left of the mobile machine 28 is typically chosen as origin p(0), however, the corner point furthest to the right of the mobile machine 28 may also be used if corresponding changes are made to the present invention to take the change into account. If the leftmost corner point is chosen, the other corner points are designated, in clockwise direction from p(0) as p(1), p(2), p(3), up to p(n), where n is the total number of corner points around perimeter 24. Note that the perimeter 24 may include any number of corner points p(n). The initial length of $v_o$ is approximately equal to the distance from the origin p(0) to one-half of the width of the mobile machine 28. To compute the endpoints 102, 104 for subsequent paths 22, the length of $v_o$ is incremented in the same direction by the distance to the next path 22 to a new terminal point 106 as shown in FIG. 8. The distance between paths 22 is computed based on the pattern of the paths 22, the width and number of implements, and the space between the implements, as described for the examples of patterns in FIGS. 4a through 6b hereinabove.

Once the direction and length and terminal point 106 of $v_o$ is determined for a particular path 22, the next step is to determine a line 108 through the terminal point 106 of vector $v_o$, where the line 108 is substantially parallel to the heading of the mobile machine 28 and intersects one side of the perimeter 24 at starting point 102 and another side of the perimeter 24 at ending point 104 of the path 22. The starting point 102 and ending point 104 of each path 22 is stored in memory connected to the control system computer 40. In the preferred embodiment, the points of intersection of the line 108 with the perimeter 24 of the work area 20 are found using vectors $v_o$, $v_l$, $v_r$ and the distance 1 between the paths 22. Knowing the direction and length of vectors $v_o$, $v_l$, and $v_r$, the projection of $v_o$ on vectors $v_l$ and $v_r$ is calculated as is well known, and the endpoints of the projections are recorded as the endpoints 102, 104 of line 108.

Alternatively, the points of intersection of the line 108 with the perimeter 24 of the work area 20 may be found using the Cartesian coordinate system and the coordinates of the corner points to calculate equations for the sides of the perimeter 24, and then finding the x-coordinate of the intersection point by solving the following equation:

$$x=(b_1-b_2)/(m_2-m_1)$$

where $b_1$ and $b_2$ are the y-intercepts of the lines and $m_1$ and $m_2$ are the slopes of the lines. Once the x-coordinate of the intersection point is found, it is used in the formula for one of the lines to solve for the y-coordinate as follows:

$$y=mx+b$$

where m is the slope $m_1$ or $m_2$, b is the corresponding y-intercept $b_1$ or $b_2$, and x is the x-coordinate of the intersection point. These calculations are then repeated for line 108 and a line for the other side of the perimeter 24 which intersects line 108.

Vectors $v_{t1}$, $v_{s1}$, $v_{t2}$, and $v_{s2}$ are used to determine when the vector $v_o$ has been incremented to a terminal point 106 where the starting point 102 and/or ending point 104 of line 108 intersect a different boundary of the perimeter 24 than the previous boundary. Vectors $v_{s1}$ and $v_{s2}$ are substantially parallel to the heading of the mobile machine 28, each having an origin at the terminal point 106 of vector $v_o$. For a perimeter with four corner points, the initial origin of vector $v_{t1}$ is the corner point p(1) and the terminal point of $v_{t1}$ is at the terminal point 106 of the vector $v_o$. The vector cross product of $v_{t1}$ and $v_{s1}$ is calculated as is known, and the sign of the cross product is used to determine left and right boundary vectors $v_l$ and $v_r$ to use to calculate the start point and the end point of the next path. In the example shown in FIG. 7, if the sign of the cross product $v_{t1}$ and $v_{s1}$ is negative, then the boundary vector $v_l$ between corner points p(0) and p(1) is used. If the sign of the cross product is positive, then boundary vector $v_{l2}$ between corner points p(1) and p(2) is used.

A similar test using vectors $v_{t2}$ and $v_{s2}$ is performed to check the right boundary. For a perimeter with four corner points, the initial origin of vector $v_{t2}$ is the corner point p(3) and the terminal point of $v_{s2}$ is at the terminal point 106 of the vector $v_o$. The vector cross product of $v_{t2}$ and $v_{s2}$ is calculated as is known, and the sign of the cross product is used to determine the right boundary vector to use to calculate the start point and the end point of the next path 22. If the sign of the cross product is negative, then the boundary vector $v_r$ between corner points p(0) and p(3) is used. If the sign of the cross product is positive, then boundary vector $v_{r2}$ between corner points p(3) and p(2) is used.

Figure 9:
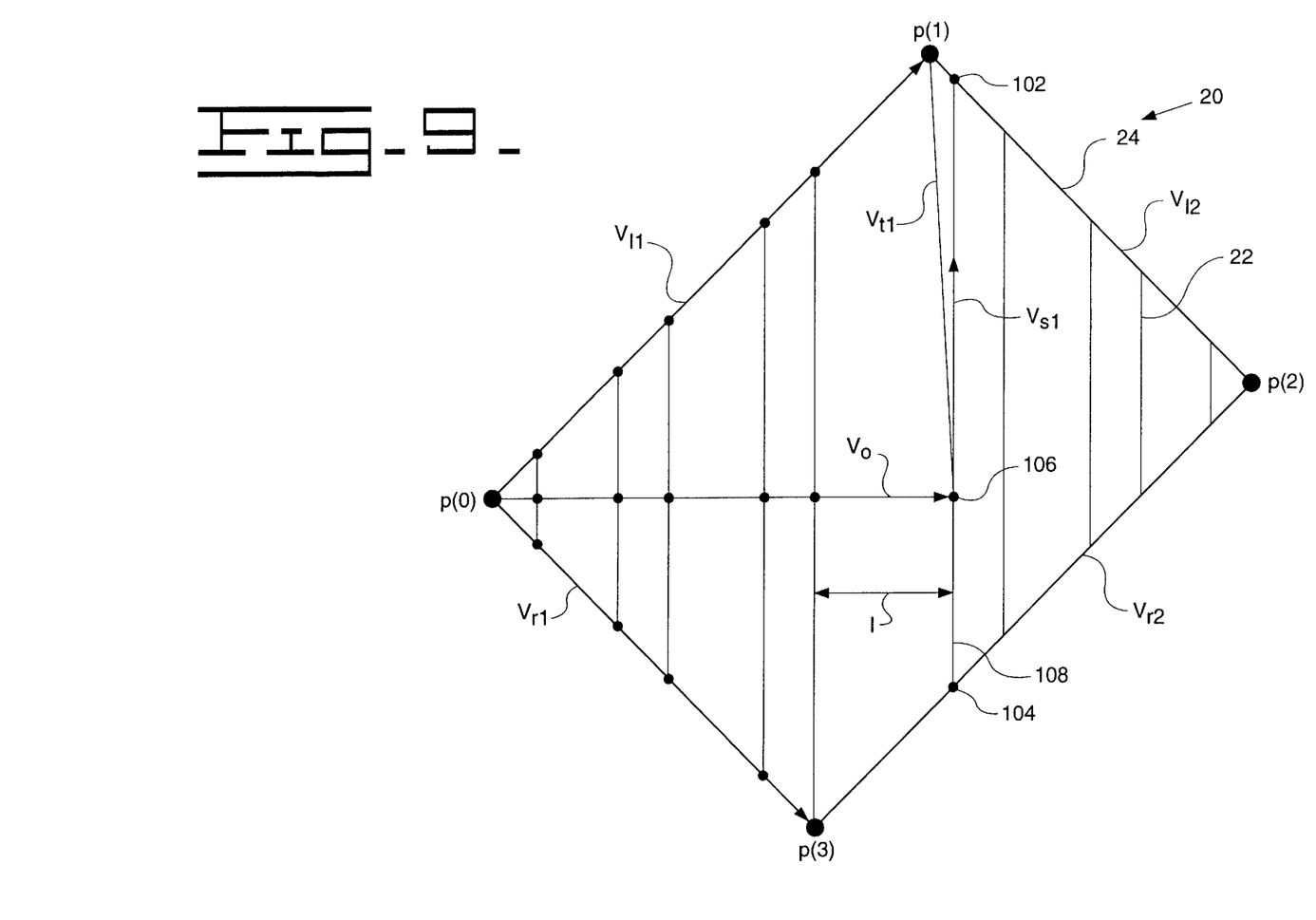
FIG. 9 is a diagrammatic representation of the vector components used to determine another one of the paths for the wheeled compactor.

FIG. 8 shows vectors $v_{t1}$ and $v_{s1}$ whose cross product is negative and FIG. 9 shows vectors $v_{t1}$ and $v_{s1}$ whose cross product is positive. In FIG. 9, line 108 intersects vector $v_{l2}$ between points p(1) and p(2) and vector $v_{r2}$ between points p(2) and p(3). When the cross product between vectors $v_{r1}$ and $v_{s1}$ is positive, the cross product indicates that a subsequent left boundary vector $v_{l2}$ should be used to calculate the endpoint 102 of line 108. When the cross product between vectors $v_{r2}$ and $v_{s2}$ is positive, the cross product indicates that a subsequent right boundary vector $v_{r2}$ should be used to calculate endpoint 104 of line 108. When new boundary vectors $v_{l2}$, $v_{r2}$ are used, the endpoints 102, 104 must be found by taking into account the distance along the old boundary vectors $v_{l1}$ and $v_{r1}$ and calculating the remaining distance along the new boundary vectors $v_{l2}$ and $v_{r2}$. This is calculated by determining the projection of the vector $v_o$ on the old boundary vectors $v_{l1}$ and $v_{r1}$, determining the overshoot of $v_o$ past $v_{t1}$ and projecting the overshoot onto the next boundary vector $v_{t2}$.

The steps of incrementing $v_o$ to the next path 22, determining line 108 through the terminal point 106 of vector $v_o$, calculating the cross product of vectors ($v_{t1}$, $v_{s1}$) and ($v_{t2}$, $v_{s2}$), and computing the endpoints of line 108, are repeated until the next path 22 is outside the perimeter 24 of work area 20.

Figure 10:
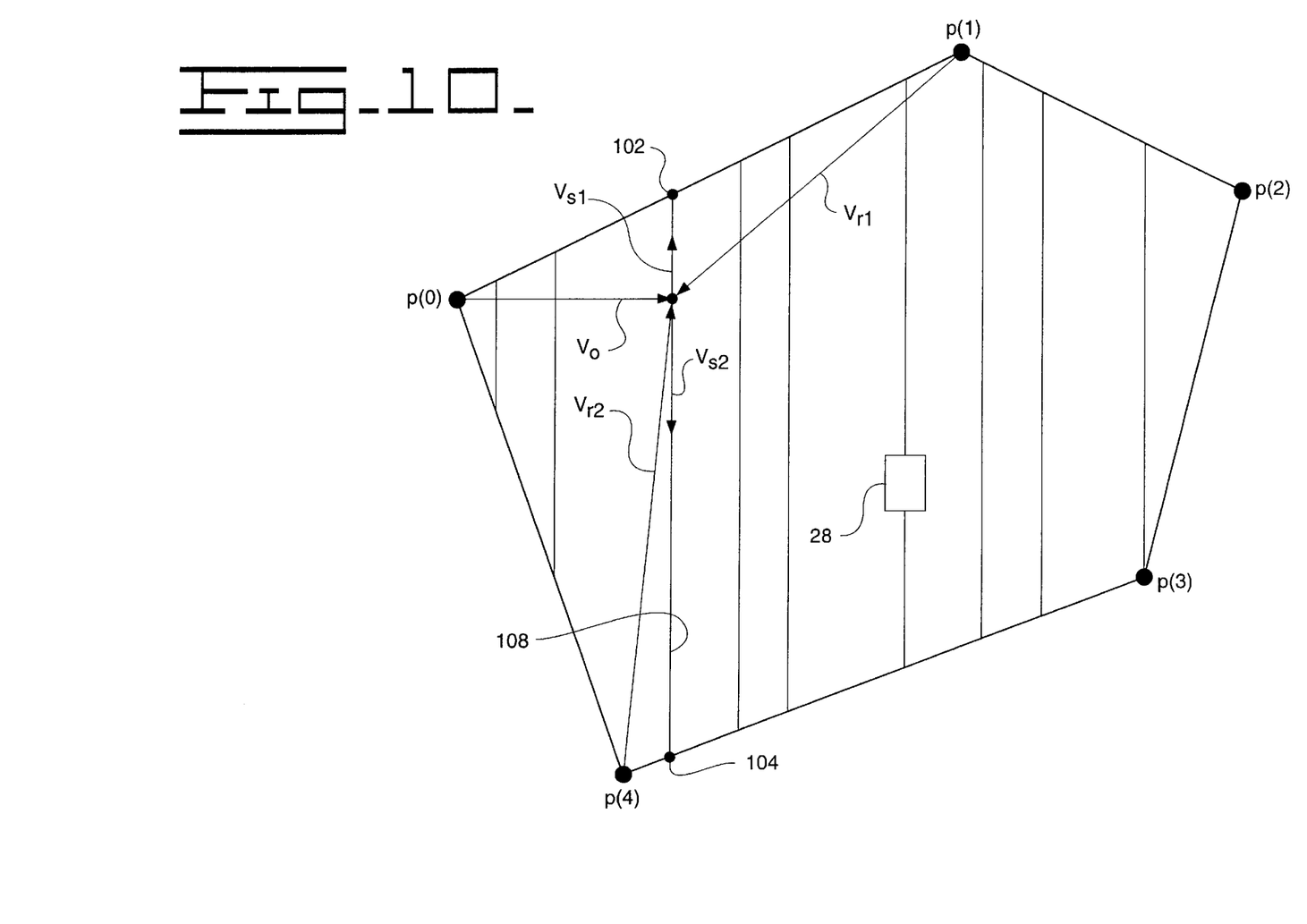
FIG. 10 is a diagrammatic representation of the vector components used to determine another one of the paths for the wheeled compactor.

The present invention is applicable to other situations where the perimeter 24 has three or more corner points, such as the perimeter in FIG. 10 having five corner points wherein p(0) is the corner point furthest to the left of the mobile machine 28, and the other corner points are numbered consecutively in the clockwise direction. The work area 20 may have any shape as dictated by factors such as property boundaries or area in which the task is to be performed. The work areas 20 shown herein are for illustrative purposes only and are not meant to limit the present invention to work areas having a particular shape or number of boundary points.

INDUSTRIAL APPLICABILITY

The present invention for establishing the perimeter 24 of the work area 20 may be advantageously used in a system for autonomous control of a mobile machine 28. The principles and applications of the present invention lend themselves to virtually any mobile machine 28 that traverses a work area 20 while performing a task. Such mobile machinery may be equipped in known fashion with an electro-hydraulic control system 42 as discussed hereinabove. The control system 42 for autonomous mobile machinery includes several software programs that may be executed in the control system computer 40. These software programs include a work planner for generating paths 22, a path planner for planning transitions between the paths 22, and a path follower for determining which way to steer the mobile machine 28 to follow the paths 22. These software programs require knowledge regarding the perimeter 24 of the work area 20 for various reasons including to avoid trespassing on another's property or to avoid operating the mobile machine 28 in undesirable areas such as near the edge of cliffs, lakes, or obstacles. The control system 42 may also generate the cushion boundary 26 once the perimeter 24 is established which provides a further buffer in the event that sensor system 30 provides position data containing errors due to inaccuracies in the sensor system 30.

Other aspects, objects and advantages of the present invention can be obtained from a study of the drawings, the disclosure and the appended claims.

What is claimed is:

1. A method for determining a path for a mobile machine to follow in a work area bounded by a perimeter having a plurality of corner points, the method comprising the steps of:
    (a) determining the heading of the path based on the heading of the mobile machine;
    (b) calculating a vector substantially perpendicular to the heading of the mobile machine;
    (c) determining the distance between adjacent paths based on the width of a work implement on the mobile machine; and
    (d) determining a start point and an end point of the path based on the location of the corner points, the perimeter of the work area, and the width of the work implement.

2. The method, as set forth in claim 1, wherein the vector has an origin at a corner point adjacent one side of the mobile machine and a length proportional to the width of the work implement.

3. The method, as set forth in claim 2, wherein the step (d) further comprises determining a line through the terminal point of the vector, the line being substantially parallel to the heading of the mobile machine and intersecting two sides of the perimeter, one point of the intersecting being the start point of the path and the other point of the intersecting being the end point of the path.

4. A method for determining a series of paths for a mobile machine to follow in a work area, the work area being bounded by a multi-sided perimeter having a plurality of corner points, the method comprising the steps of:
    (a) determining the heading of the paths based on the heading of the mobile machine;
    (b) determining the width of a path based on the width of a work implement on the mobile machine;
    (c) calculating a first vector substantially perpendicular to the heading of the mobile machine, the terminal point of the first vector being at a distance proportional to the width of the path and the origin of the first vector being at the corner point adjacent the left side of the mobile machine having the furthest distance from the mobile machine;
    (d) determining a start point and an end point for the path based on the location of the corner points, the perimeter of the work area, and the first vector;
    (e) incrementing the terminal point of the first vector perpendicular to the heading of the mobile machine by the distance to an adjacent path in the series of paths;
    (f) calculating a second vector substantially parallel to the heading of the mobile machine, the second vector having an origin at the terminal point of the first vector;
    (g) calculating a third vector, the origin of the third vector being at the corner adjacent the furthest corner point in the clockwise direction and the terminal point of the third vector being at the terminal point of the first vector;
    (h) calculating the vector cross product of the second and the third vectors;
    (i) using the sign of the cross product to determine the side of the perimeter to use to calculate the start point and the end point of the next path;
    (j) determining a start point and an end point for the next path based on the terminal point of the first vector and the perimeter of the work area;
    (k) repeating steps (e) through (j) until the next path is outside the perimeter of the work area.

5. The method, as set forth in claim 4, wherein the step (d) further comprises determining a line through the terminal point of the first vector, the line being substantially parallel to the heading of the mobile machine and intersecting two sides of the perimeter, one point of the intersecting being the start point of the path and the other point of the intersecting being the end point of the path.

6. The method, as set forth in claim 4, wherein the step (j) further comprises determining a line through the terminal point of the first vector, the line being substantially parallel to the heading of the mobile machine and intersecting two sides of the perimeter, one point of the intersecting being the start point of the next path and the other point of the intersecting being the end point of the next path.

7. An apparatus for determining a path for a mobile machine to follow in a work area bounded by a perimeter having a plurality of corner points, the apparatus comprising:

a positioning system for providing position data for the mobile machine;

a data processor in communication with the positioning system, the data processor being operable to determine the heading of the mobile machine based on said position data from the positioning system;

the data processor being further operable to determine the heading of the path based on the heading of the mobile machine;

the data processor being further operable to determine the width of the path based on the width of a work implement on the mobile machine; and the data processor being further operable to determine a start point and an end point of the path based on the location of the corner points, the perimeter of the work area, and the width of the work implement.

8. The apparatus, as set forth in claim 7, wherein the data processor is further operable to determine the start point and the end point of the path by calculating a vector substantially perpendicular to the heading of the mobile machine, the vector having a length proportional to the width of the path and an origin at one of the corner points adjacent one side of the mobile machine.

9. The apparatus, as set forth in claim 8, wherein the data processor is further operable to determine a line through the terminal point of the vector, the line being substantially parallel to the heading of the mobile machine and intersecting two sides of the perimeter, one point of the intersecting being the start point of the path and the other point of the intersecting being the end point of the path.

10. An apparatus for determining a series of paths for a mobile machine to follow in a work area, the work area being bounded by a multi-sided perimeter having a plurality of corner points, the apparatus comprising:

a data processor in communication with a positioning system, the positioning system providing data on the position, speed, and heading of the mobile machine, the data processor being operable to determine the heading of the paths based on the heading of the mobile machine;

the data processor being further operable to determine the width of a path based on the width of a work implement on the mobile machine;

the data processor being further operable to calculate a first vector substantially perpendicular to the heading of the mobile machine, the terminal point of the first vector being at a distance proportional to the width of the path and the origin of the first vector being at the corner point adjacent the left side of the mobile machine having the furthest distance from the mobile machine;

the data processor being further operable to determine a start point and an end point for the path based on the location of the corner points, the perimeter of the work area, and the first vector;

the data processor being further operable to repeatedly increment the terminal point of the first vector perpendicular to the heading of the mobile machine by the width of a next path in the series of paths, to calculate a second vector substantially parallel to the heading of the mobile machine, the second vector having an origin at the terminal point of the first vector, to calculate a third vector, the origin of the third vector being at the corner adjacent the furthest corner point in the clockwise direction and the terminal point of the third vector being at the terminal point of the first vector, to calculate the vector cross product of the second and the third vectors, to determine the side of the perimeter to use to calculate the start point and the end point of the next path using the sign of the cross product, to determine a start point and an end point for the next path based on the terminal point of the first vector and the perimeter of the work area, until the next path is outside the perimeter of the work area.

11. The apparatus, as set forth in claim 10, wherein the data processor is further operable to determine a line through the terminal point of the first vector, the line being substantially parallel to the heading of the mobile machine and intersecting two sides of the perimeter, one point of the intersecting being the start point of the path and the other point of the intersecting being the end point of the path.

12. The apparatus, as set forth in claim 10, wherein the data processor is further operable to determining a line through the terminal point of the first vector, the line being substantially parallel to the heading of the mobile machine and intersecting two sides of the perimeter, one point of the intersecting being the start point of the next path and the other point of the intersecting being the end point of the next path.

* * * * *